Patented June 14, 1949

2,473,439

UNITED STATES PATENT OFFICE 2,473,439

MOTOR FUEL

Herbert Lightfoot Maxfield, Banstead, England, assignor to The Distillers Company Limited, Edinburgh, Scotland, a British company No Drawing. Application December 22, 1947, Serial No. 793,324. In Great Britain January 11, 1947

6 Claims. (Cl. 44—53)

The present invention is for a fuel for internal combustion engines particularly for use when the development of maximum power is required.

Mixtures of ethanol with a large proportion of hydrocarbons of low molecular weight have been widely used as fuel for high-compression engines. It is also known that the addition of a small proportion of readily volatilisable hydrocarbons to an alcoholic fuel lowers its flash point and thereby improves its ignition and, in consequence, its starting qualities in combustion engines, above all in cold weather, the flash point of 95% by volume alcohol being 16° C. whilst common petrol has a flash point of the order of —25° C. to —30° C.

It has been suggested, furthermore, to introduce into the engine cylinder with the fuel charge a certain amount of water in the liquid phase, in excess of the 5% of water which is the amount generally contained in ordinary industrial ethanol, in order to cool the walls of the cylinder together with the piston, the exhaust valves and the sparking plug points by making use of the latent heat necessary for the evaporation of the water. The presence of water vapour in the compressed charge offers the further advantage that the tendency to detonate is greatly reduced, and so allows the use of higher compression in the engine cylinder. The higher the proportion of water which is introduced into the cylinder, therefore, the more effective it will be for cooling purposes, provided naturally that the vapourised blend will explode after having been mixed with air. Proportions of water as high as 30% of the total mixture of combustible material and water have been suggested as practicable and desirable.

The introduction of the water in the liquid phase is most conveniently carried out in admixture with the actual fuel. This meets, however, with the difficulty that the tolerance for water in mixtures of ethyl alcohol and hydrocarbons is not very great, so that even small quantities of water cause the formation of separate layers.

This difficulty in the practical use of such blends is further enhanced when said mixtures are exposed to lower atmospheric temperatures as easily happens in aircraft or in storage tanks during the cold season.

In accordance with this invention a motor fuel for use in high pressure internal combustion engines comprises about 60 parts of a mixture containing about 26 to 36 parts of ethanol and the rest of secondary butanol—that is 34 to 24 parts— with about 5 to 10 parts of hydrocarbons with 3 to 5 carbon atoms in the molecule, and from 10 to 30 parts of water.

The parts referred to throughout this specification and the appended claims are parts by volume.

As hydrocarbons, paraffins with 3 to 5 carbon atoms in the molecule are used. Such paraffins are for instance, propane, butane, pentane, isopentane and the like. With these paraffins there may be admixed minor proportions, e. g. up to 25%, of olefines with 3 to 5 carbon atoms in the molecule possessing not more than one double linkage in the molecule such as propylene, butene, methyl butene. Hydrocarbons with more than 5 carbon atoms in the molecule, such as hexane and heptane will not materially affect the water tolerance of the fuel composition according to this invention as long as they are not present in substantial quantities, e. g. in an amount which does not exceed about 10% of the total hydrocarbon content of the mixture.

In the following description pentane is mentioned as hydrocarbon by way of example, but it is to be understood that the invention is not limited to the use of this substance.

It has been found that by the presence of secondary butanol in conjunction with ethanol the mixture of both amounting to about 60 parts, the tolerance for water in the pentane containing blend is raised very considerably. In the absence of secondary butanol, a composition containing only ethanol in an amount of 70 parts, 10 parts of pentane, and 20 parts of water, separates into two layers even at as high a temperature as 20° C. By replacing half the volume of ethanol by secondary butanol and mixing 60 parts of this blend with 10 parts of pentane, up to 30 parts of water are retained in a one phase mixture down to a temperature of —3°. On the other hand, a blend consisting of 60 parts of secondary butanol, 10 parts of pentane and 30 parts of water shows two phases at 21° C.

By altering the relative proportion of ethanol and secondary butanol in the mixture within the limits of 26 to 36 parts of ethanol to 34 to 24 parts of secondary butanol to be blended with 10 parts of hydrocarbon and 30 parts of water it is possible to vary the tolerance for water in the composition with respect to the influence of temperature. For example, a blend containing 60 parts of a mixture of 26 parts of ethanol and 34 parts of secondary butanol, forms with 10 parts of pentane and 30 parts of water a one-phase mixture down to 12° C., whilst 60 parts of a blend of equal parts of ethanol and secondary butanol, and other ingredients remaining the same as above is stable in a one-phase mixture down to −3° C., and a blend of 60 parts containing 36 parts of ethanol, rest secondary butanol, again with the same amounts of pentane and water, does not separate into two layers at temperatures above −6° C. An increase of the ethanol proportion in the blend beyond 36 parts to, say, 38 parts results in mixtures which even at ordinary temperatures separate into two layers when mixed in the same way with 10 parts of pentane and 30 parts of water. It is, therefore, a feature of the present invention to make the fuel mixture more resistant to the influence of lower temperatures by increasing ethanol in proportion to secondary butanol within the limits of 26 to 36 parts in the total volume of 60 parts, keeping the pentane contained in the mixture at 10 parts.

It has been found, furthermore, that by reducing the amount of hydrocarbons in the total mixture, it is possible to increase the tolerance for water of the blend still further so that a one-phase mixture containing 30 parts of water is maintained at temperature ranges as low as −10 to −20° C. Accordingly a composition containing 30 to 36 parts of ethanol, 30 to 24 parts of secondary butanol and 5 parts of pentane, will retain 30 parts of water, even when exposed to such severe winter temperatures as −20° C.

The pentane referred to above had a boiling point of between 35.1 and 37.8° C.

The maximum tolerance for water at a desired temperature of a mixture of ethanol, secondary butanol and hydrocarbon within the specified limits can be ascertained if necessary by a simple test. A measured quantity of a mixture of said organic substances is cooled to and maintained at the desired temperatures and measured amounts of water are gradually added thereto with vigorous shaking or stirring. The tolerance limit for water can be concluded from the maximum amount of water which is taken up by the mixture without causing lasting turbidity or separation into two layers when, after addition of the water, the agitation is stopped and the mixture allowed to stand for some time.

I claim:

1. A fuel for internal combustion engines composed of 60 parts of a mixture consisting of 26 to 36 parts by volume of ethanol, remainder secondary butanol, from 5 to 10 parts of hydrocarbons selected from the group of paraffins and olefines with 3 to 5 carbon atoms in the molecule, the latter having not more than one double linkage in the molecule, and from 10 to 30 parts of water, the proportions being chosen within said limits so that at atmospheric temperatures at which the fuel is used the mixture is homogeneous.

2. A fuel for internal combustion engines composed of 60 parts of a mixture consisting of 26 to 36 parts of ethanol, remainder secondary butanol, from 5 to 10 parts of a mixture of hydrocarbons selected from the group of paraffins and olefines with 3 to 5 carbon atoms in the molecule and the latter having not more than one double linkage in the molecule, the olefines being not more than 25% of said hydrocarbon mixture, and from 10 to 30 parts of water, the proportions being chosen within said limits so that at atmospheric temperatures at which the fuel is used the mixture is homogeneous.

3. A fuel for internal combustion engines composed of 60 parts of a mixture consisting of 26 to 36 parts of ethanol, remainder secondary butanol, from 5 to 10 parts of pentane and from 10 to 30 parts of water, the proportions within said limits being chosen so that at the temperatures at which the fuel is used the mixture is homogeneous.

4. A fuel for internal combustion engines homogeneous at temperatures down to −6° C. composed of 36 parts of ethanol, 24 parts of secondary butanol, about 10 parts of pentane and from 10 to 30 parts of water.

5. A fuel for internal combustion engines homogeneous at temperatures down to −20° C. composed of 60 parts of a mixture consisting of 30 to 36 parts of ethanol, remainder secondary butanol, from 10 to 30 parts of water and 5 parts of pentane.

6. A fuel for internal combustion engines homogeneous at temperatures down to −20° C. composed of 60 parts of a mixture consisting of 30 to 36 parts of ethanol, remainder secondary butanol, from 10 to 30 parts of water, 4 parts of pentane and 1 part of an olefine with 3 to 5 carbon atoms in the molecule and having not more than one double linkage in the molecule.

HERBERT LIGHTFOOT MAXFIELD.

REFERENCES CITED

The following references are of record in the file of this patent:

UNITED STATES PATENTS

| Number | Name | Date |
|---|---|---|
| 2,365,009 | Robertson | Dec. 12, 1944 |
| 2,404,094 | Robertson | July 16, 1946 |
| 2,408,999 | Robertson | Oct. 8, 1946 |